United States Patent
Long

(10) Patent No.: US 10,711,200 B2
(45) Date of Patent: Jul. 14, 2020

(54) NANOBUBBLE AIDED BITUMEN EXTRACTION FROM OIL SAND

(71) Applicant: SYNCRUDE CANADA LTD. in trust for the owners of the Syncrude Project as such owners exist now and in the future, Fort McMurray (CA)

(72) Inventor: Jun Long, Edmonton (CA)

(73) Assignee: SYNCRUDE CANADA LTD. in trust for the owners of the Syncrude Project as such owners exist now and in the future, Fort McMurray (CA)

( * ) Notice: Subject to any disclaimer, the term of this patent is extended or adjusted under 35 U.S.C. 154(b) by 205 days.

(21) Appl. No.: 15/876,773

(22) Filed: Jan. 22, 2018

(65) Prior Publication Data

US 2018/0208854 A1 Jul. 26, 2018

Related U.S. Application Data

(60) Provisional application No. 62/449,478, filed on Jan. 23, 2017.

(51) Int. Cl.
*C10G 1/04* (2006.01)
*B03B 9/02* (2006.01)
(Continued)

(52) U.S. Cl.
CPC .......... *C10G 1/047* (2013.01); *B01D 11/0257* (2013.01); *B01D 11/0261* (2013.01);
(Continued)

(58) Field of Classification Search
CPC .... C10G 1/047; C10G 1/006; C10G 2300/80; C10G 2300/40; B01D 11/0288; B01D 11/0284; B01D 11/0261; B01D 11/04; B01D 11/0257; B03D 1/247; B03D 1/082; B03D 1/10; B03D 1/02; B03D 2203/006; C10C 3/04; B01F 3/04106; B01F 3/026; B01F 2215/0083; C08L 95/00; B03B 9/02
See application file for complete search history.

(56) References Cited

U.S. PATENT DOCUMENTS 9,321,663 B2   4/2016  Sikes et al.
2017/0218277 A1*  8/2017  Faghihnejad .......... C10G 1/047

FOREIGN PATENT DOCUMENTS

AU   2012100021 A4   2/2012
CA       2792355      *   9/2011
(Continued)

OTHER PUBLICATIONS

Agarwal, A.; Ng, W.; Liu, Y., Principle and applications of microbubble and nanobubble technology for water treatment, Chemosphere, vol. 84, 1175-1180, 2011.
(Continued)

*Primary Examiner* — Prem C Singh
*Assistant Examiner* — Juan C Valencia
(74) *Attorney, Agent, or Firm* — Bennett Jones LLP

(57) ABSTRACT

A water-based extraction process for extracting bitumen from mined oil is provided comprising providing a water-based mixture containing bitumen; and introducing nanobubbles to the mixture to attach to bitumen and, thereby, extract the bitumen from the water-based mixture, wherein a nanobubble has a diameter of less than 5,000 nm.

12 Claims, 4 Drawing Sheets

(51) Int. Cl.
| | |
|---|---|
| B01D 11/02 | (2006.01) |
| B01F 3/02 | (2006.01) |
| B01D 11/04 | (2006.01) |
| C08L 95/00 | (2006.01) |
| C10G 1/00 | (2006.01) |
| B03D 1/02 | (2006.01) |
| B03D 1/10 | (2006.01) |
| B03D 1/08 | (2006.01) |
| B01F 3/04 | (2006.01) |
| C10C 3/04 | (2006.01) |
| B03D 1/24 | (2006.01) |

(52) U.S. Cl.
CPC ...... *B01D 11/0284* (2013.01); *B01D 11/0288* (2013.01); *B01D 11/04* (2013.01); *B01F 3/026* (2013.01); *B01F 3/04106* (2013.01); *B03B 9/02* (2013.01); *B03D 1/02* (2013.01); *B03D 1/082* (2013.01); *B03D 1/10* (2013.01); *B03D 1/247* (2013.01); *C08L 95/005* (2013.01); *C10C 3/04* (2013.01); *C10G 1/006* (2013.01); *B01F 2215/0083* (2013.01); *B03D 2203/006* (2013.01); *C10G 2300/40* (2013.01); *C10G 2300/80* (2013.01)

(56) References Cited

FOREIGN PATENT DOCUMENTS

| CA | 2792355 A1 * | 9/2011 | ......... B01D 11/0211 |
|---|---|---|---|
| CA | 2792355 A1 | 9/2011 | |
| CA | 2922218 A1 | 3/2015 | |

OTHER PUBLICATIONS

Calgaroto, S.; Wilberg, K.; Rubio, J., On the nanobubbles interfacial properties and future applications in flotation, Minerals Eng., vol. 60, 33-40, 2014.

Eriez Flotation Division, Cavitation-Tube Sparging System—Technical Bulletin.

Fan, M.; Tao, D.; Honaker, R.; Luo Z., Nanobubble generation and its application in froth flotation (Part I): nanobubble generation and its effects on properties of microbubble and millimeter scale bubble solutions, Mining Sci. Tech., vol. 20(1), 1-19, 2010.

Masliyah, J., et al., Understanding Water-Based Bitumen Extraction from Athabasca Oil Sands, Can. J. Chem. Eng., vol. 82(4), 628-654, 2004.

Ushikubo, F.; Furukawa, T.; Nakagawa, R.; Enari, M.; Makino, Y.; Kawagoe, Y.; Shiina, T.; Oshita, S.; Evidence of the existence and the stability of nano-bubbles in water, Colloids and Surfaces A: Physicochemical and Engineering Aspects, vol. 361, 31-37, 2010.

Wu, C., et al. Generation and Characterization of Submicron Size Bubbles, Advances in Colloid and Interface Science, 179-182, p. 123-132, 2012.

Zimmerman, W.B., et al., Towards Energy Efficient Nanobubble Generation with Fluidic Oscillation, Current Opinion in Colloid & Interface Science, 16, p. 350-356, 2011.

Zhou, Z.; Chow, R.; Cleyle, P.; Xu, Z.; Masliyah, J., Effect of Dynamic Bubble Nucleation on Bitumen Flotation, Can. Metal. Quarterly, vol. 49 (4), 363-372, 2010.

Zhou, Z.; Xu, Z.; Finch, J.; Hu, H.; Rao, R., Role of hydrodynamic cavitation in fine particle flotation, Intern. J. Min. Proc., vol. 51 (1-4), 139-149, 1997.

Zhou, Z.; Xu, Z.; Finch, J.; Masliyah, J.; Chow, R., On the role of cavitation in particle collection in flotation—A critical review. II, Minerals Eng., vol. 22 419-433, 2009.

Zhou, Z.; Xu, Z.; Finch, J., On the role of cavitation in particle collection during flotation—a critical review, Minerals Eng., vol. 7(9), 1073-1084, 1994.

* cited by examiner

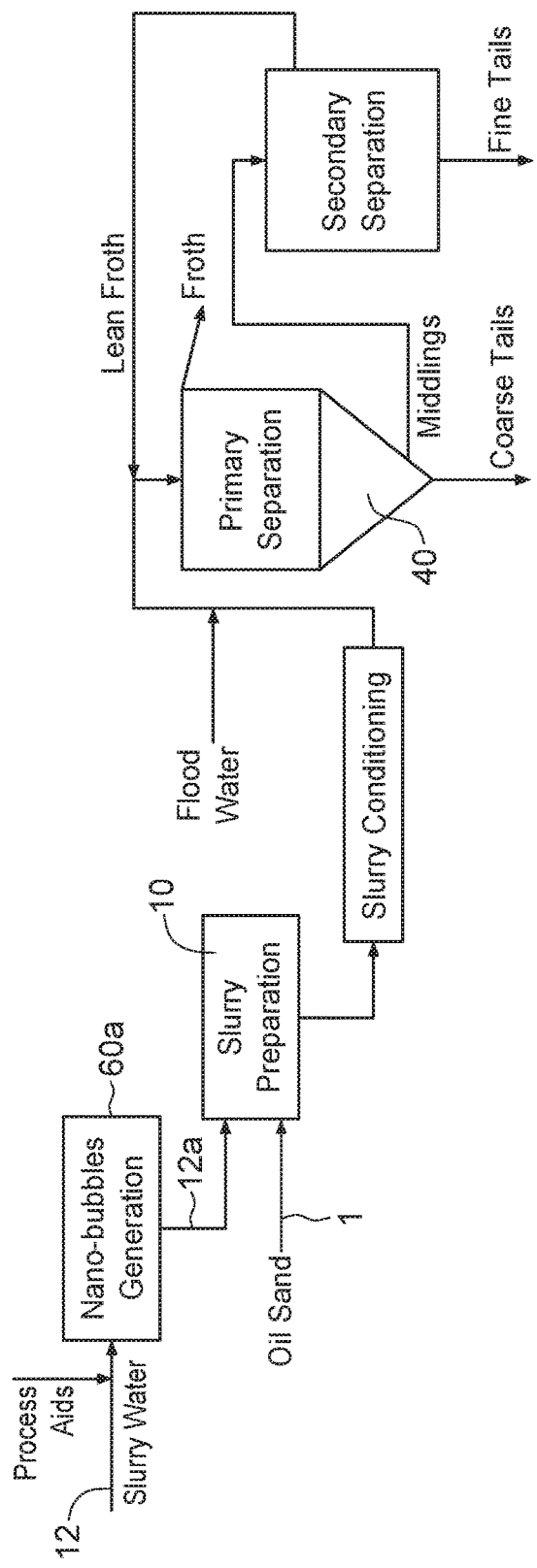
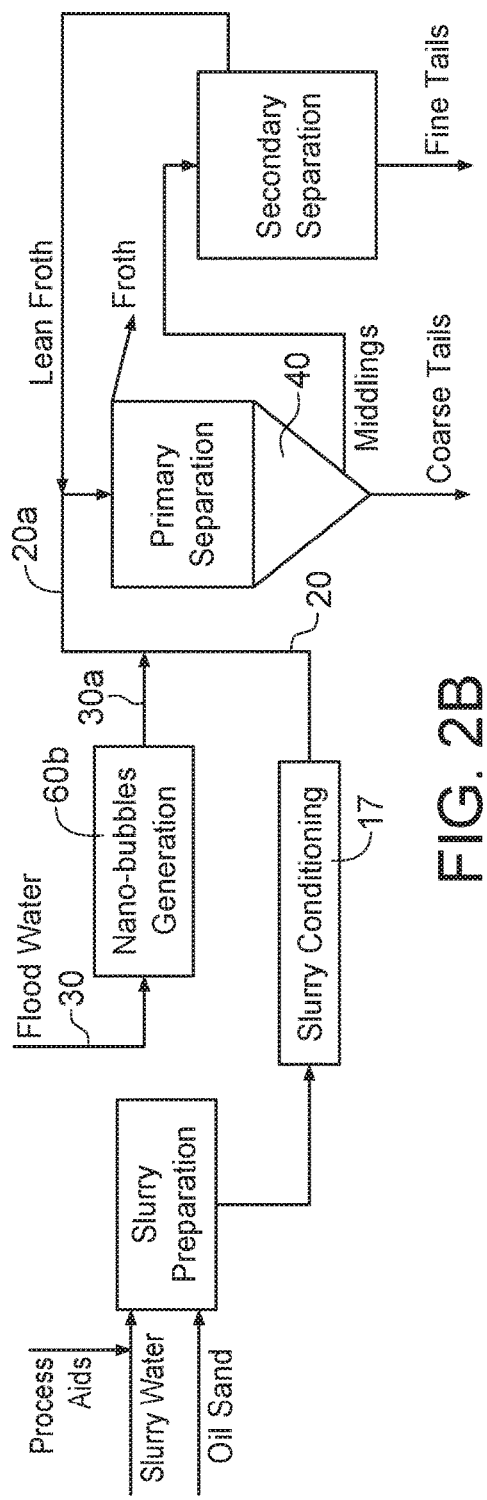
FIG. 2A
FIG. 2B

NANOBUBBLE AIDED BITUMEN EXTRACTION FROM OIL SAND

The invention relates to bitumen extraction from oil sand. In particular, the invention relates to the use of nanobubbles to aid in bitumen extraction.

BACKGROUND OF THE INVENTION

In a water-based bitumen extraction process, the efficiency of bitumen separation from mined oil sand is primarily determined by bitumen liberation from the sand grains to form bitumen droplets and bitumen recovery through coalescence, aeration and flotation of the bitumen droplets. Generally, aeration occurs due to natural entrainment of air and mechanical agitation of the water and oil sand slurry. The air bubbles present in an oil sand slurry are generally of a micro-size.

There is a strong correlation between bitumen droplet size and bitumen recovery. In general, good bitumen recovery could be obtained if the average size of bitumen droplets is greater than 400 μm. On the other hand, the recovery may be very poor if the average size of bitumen droplets is smaller than 200 μm. For small bitumen droplets (e.g., ≤200 μm), flotation is challenging.

When a bitumen droplet is very small, its probability of collision with another droplet for coalescence and with an air bubble for aeration is very low. This is because a small droplet does not possess sufficient kinetic energy to deviate from the streamlines and to displace the intervening liquid layer to collide with other bitumen droplets and/or bubbles. In addition, the interaction forces between bitumen droplets and between bitumen droplets and air bubbles are naturally repulsive due to the operation conditions normally used (slurry pH in the range of 7.5 to 9.5). The presence of strong repulsive forces makes coalescence and aeration difficult. Thus, small bitumen droplets do not readily float to the top of a separation vessel to be recovered as bitumen froth.

With respect to mined oil sands, it has been found that for oil sands that do not respond well to processing, referred to as problem ores or poor processing ores (e.g., some low-grade, high-fines ores), the average size of the bitumen droplets generated by the existing bitumen extraction processes is often small, leading to poor extraction performance. In order to improve the overall performance of a water-based bitumen extraction process especially for problem ores, the efficiency of bitumen droplets coalescence and aeration needs to be improved to increase the average size of final bitumen droplets.

In existing water-based bitumen extraction processes, caustic is often used as a process aid to improve the overall performance. Caustic helps to release natural surfactants and affects surface properties of bitumen, sand, and clays. The use of caustic reduces the attachment of fine solid particles on bitumen surface (so called slime coating), thus facilitating the coalescence and aeration of bitumen droplets. However, the use of caustic increases the slurry pH and thus increases the repulsions between bitumen droplets and between bitumen droplets and air bubbles. The use of a conditioning step in existing extraction processes with mechanical energy input also helps the coalescence and aeration of bitumen droplets, improving the overall performance. However, when processing problem ores, the use of caustic and the existing conditioning step cannot provide enough improvement to obtain desirable performance.

SUMMARY OF THE INVENTION

It was surprisingly discovered that generating nanobubbles in a process stream during water-based bitumen recovery improved bitumen recovery and overall extraction performance.

Thus, in one aspect of the present application, a process is provided for extracting bitumen from mined oil sands during a water-based extraction, the process comprising:
 providing a water-based mixture containing bitumen; and
 introducing nanobubbles to the mixture to attach to bitumen and, thereby, extract the bitumen from the water-based mixture, wherein a nanobubble has a diameter of less than 5,000 nanometers (nm).

In another aspect of the present invention, process is provided for extracting bitumen from mined oil sands during a water-based extraction, the process comprising:
 mixing slurry water and mined oil sands in a slurry preparation unit to form an oil sand slurry containing bitumen droplets;
 conditioning the oil sand slurry to promote bitumen droplet coalescence and aeration to form conditioned oil sand slurry;
 subjecting the conditioned oil sand slurry to gravity separation to form a bitumen froth, a middlings stream and coarse tailings;
 optionally adding flood water to the conditioned oil sand slurry prior to subjecting it to gravity separation; and
 introducing nanobubbles to the slurry water, the flood water, the oil sand slurry, the conditioned oil sand slurry, or combinations thereof.

Other features will become apparent from the following detailed description. It should be understood, however, that the detailed description and the specific embodiments, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIGS. 2a to 2e are schematics of processes according to the invention.

DESCRIPTION OF VARIOUS EMBODIMENTS

Figure 1:
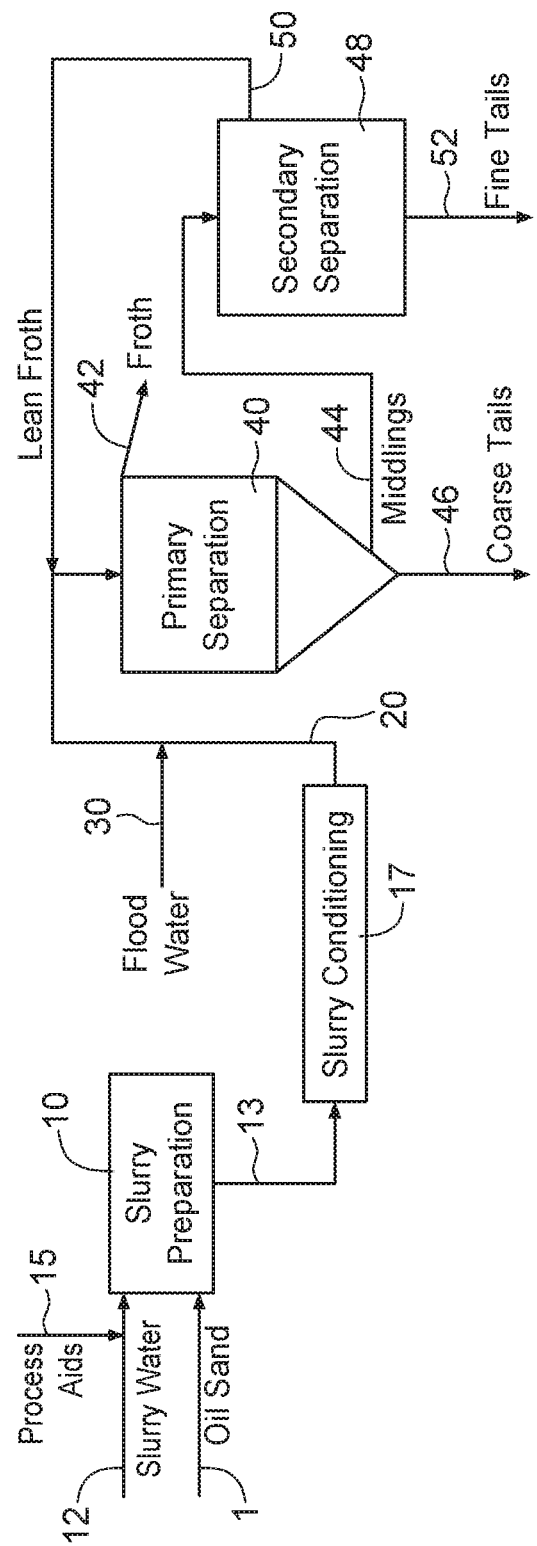
FIG. 1 is a schematic of a generalized hot water extraction process for oil sand.

The invention is exemplified by the following description and examples.

The invention adds a nanobubble generation step to an oil sand processing method for extraction of bitumen from the oil sand. A method for extracting bitumen from oil sands during a water-based extraction includes introducing nanobubbles to a water-based mixture containing bitumen in order to aid in the extraction and recovery of the bitumen from the mixture. Without being bound to theory, it is believed that the nanobubbles present in the oil sand slurry act as bridges between bitumen droplets and between bitumen droplets and micro-bubbles, facilitating bitumen coalescence and aeration. In particular, the nanobubbles may attach onto the surface of bitumen droplets to improve the attachment of microbubbles to bitumen droplets and enhance bitumen droplet aeration, thereby improving the overall bitumen extraction process. Nanobubbles may also depress slime coating, thereby facilitating the coalescence and aeration of bitumen droplets.

As used herein, a "nanobubble" is defined as a bubble, typically containing air, with a diameter of less than 5,000 nanometers (nm) and possibly less than 2,000 nm, less than 1,000 nm or less than 500 nm.

As used herein, a "microbubble" is defined as a bubble, typically containing air, with a diameter of greater than 5 microns (μm) and up to 3 mm. Microbubbles can be generated by mechanical agitation or by natural entrainment.

Generally, in a process for water-based bitumen extraction from mined oil sand, the oil sand is mixed with process water. The water generally ranges in temperature from about 95° C. to about 20° C. Optionally, process aids such as, for example, NaOH (caustic) may be added to the process water. The oil sand and process water is mixed in a slurry preparation system to produce oil sand slurry, where air may be naturally entrained and microbubbles generated due to mechanical agitation. Oil sand slurry is then conditioned.

As used herein, "conditioning" includes digestion of oil sand lumps, liberation of bitumen from sand-fines-bitumen matrix, coalescence of liberated bitumen into larger bitumen droplets and aeration of bitumen droplets. It is understood that such conditioning can occur by agitating the oil sand slurry in a conventional rotating tumbler or agitation tank for a sufficient period of time, during which air is entrained and microbubbles are generated, or by preparing the oil sand slurry in a slurry preparation unit and then pumping the oil sand slurry through a pipeline of sufficient length, e.g., typically greater than about 2.5 km (often referred to in the industry as hydrotransport). During slurry preparation and hydrotransport, natural air entrainment and generation of microbubbles occurs. The air bubbles produced during slurry preparation and hydrotransport are generally micro-sized, i.e., microbubbles. The oil sand slurry is generally first contained in a mixing or pump box prior to being pumped through the conditioning pipeline.

The conditioned oil sand slurry from the pipeline may be further diluted with flood water, if needed, to ensure the proper density of the slurry, e.g., approximately 1.4 g/cc to 1.5 g/cc, and, optionally, further aerated, prior to being fed into a quiescent gravity separation vessel commonly referred to in the industry as a primary separation vessel. In the primary separation vessel, separate layers of primary bitumen froth, middlings and sand tailings are formed.

At least a portion of the primary bitumen froth produced in the primary separation vessel, said portion in one embodiment ranging anywhere from about 10% to about 50%, is continuously removed.

Middlings are sent to secondary separation, which generates a lean froth and fine tailings.

Tailings from the primary and secondary separations are further processed for at least water recovery.

FIG. 1 illustrates an example of one possible water-based bitumen extraction process from oil sand. Oil sand 1 is conveyed to an oil sand slurry preparation system 10, wherein the oil sand is mixed with water 12 to form a slurry 13. Optionally, process aids 15, such as for example, NaOH (caustic), sodium silicate, soda ash (sodium carbonate), sodium tri-phosphate, lime, kerosene, diesel, sodium citrate, and combinations thereof, are also added to system 10. The oil sand slurry preparation system 10 can take one of many forms. For example system 10 may include any one or more of mixers, baffles, screens, pumps, cyclofeeders, or compact systems.

The oil sand slurry 13 from system 10 is then conditioned in a slurry conditioning system 17, such as for example by pumping through a conditioning pipeline to form a conditioned slurry 20.

During oil sand slurry preparation and conditioning, air is entrained and microbubbles form due to mechanical agitation for aeration of released and coalesced bitumen droplets.

Optionally, flood (dilution) water 30 is added to the conditioned slurry prior to feeding the slurry to a primary separation vessel 40 ("PSV") for primary separation. Primary separation generates separate streams of primary bitumen froth 42, middlings 44 and sand tailings, often called coarse tailings 46.

In one embodiment, the PSV may be of the deep cone type as illustrated, but this may vary.

A portion of the primary bitumen froth 45 is continuously withdrawn from the PSV 40. Froth 42 contains a significant quantity of bitumen recovered from the oil sand and is sent for further processing.

The middlings 44 may be further treated for additional bitumen recovery, in a secondary recovery circuit as known in the art such as a secondary separation vessel ("SSV") 48. SSV 48 may also take various forms such as one or more flotation cells, deep cone vessels, etc. Secondary recovery generates streams of lean froth 50 and tailings, often referred to as fine tailings 52.

Lean froth 50 is sent for further processing such as, for example, recycled back to primary separation 40, as shown.

Nanobubbles can be injected at various stages of the above-noted process to enhance bitumen extraction.

The nanobubbles may be added to the mixture directly or they may be added to the water or other liquid additive prior to the mixing to form the mixture. In particular, a nanobubble generator may be installed in a slurry line or in an input stream. The generation of nanobubbles in a fluid is feasible through some handling techniques such as hydrodynamic cavitation (aka: gas nucleation). Apparatuses for nanobubble generation have become available, for example, the cavitation tube sparging system by Eriez Manufacturing Co. (Patent Application No. AU 2012100021), the baffled high intensity agitation cell (Wu, C., et al, "Generation and Characterization of Submicron Size Bubbles", Advances in Colloid and Interface Science, 179-182, pp 123-132, 2012), and the fluidic Oscillation method (Zimmerman, W. B., et al., "Towards Energy Efficient Nanobubble Generation with Fluidic Oscillation", Current Opinion in Colloid & Interface Science, 16, pp 350-356, 2011). Herein, reference to a nanobubble generator may be include fluid handling techniques and/or an installed apparatus.

FIGS. 2a to 2e show examples of the extraction processes with a nanobubble generation step. While only one nanobubble generation step is shown in each Figure, it is to be understood that a bitumen extraction process may inject nanobubbles at more than one location.

With reference to FIGS. 2a and 2b, for example, nanobubbles can be generated in process input water. For example in FIG. 2a a nanobubble generator 60a is installed for nanobubble injection into the slurry water 12 such that nanobubble-containing water 12a is introduced to slurry preparation system 10. Alternatively or in addition, a nanobubble generator 60b may be installed for nanobubble injection into the flood water 30 such that nanobubble-containing flood water 30a is introduced for dilution of conditioned slurry 20 to be processed in the PSV 40. As such, nanobubbles may be active in conditioned slurry 30a prior to primary separation.

The waters used in extraction are normally process waters, which contain a high content of organics and fine solid particles. The presence of organics, for example, those that also act as surfactants, promotes the formation of nanobubbles.

The nanobubble generators 60a, 60b could be installed directly in the slurry lines, such as in slurry preparation system 10 or in the lines prior to, in or after the conditioning system. For example, in FIG. 2c, the nanobubble generation step is applied to the oil sand slurry 13 prior to the conditioning step, specifically a nanobubble generator 60c acts on the slurry 13 after slurry preparation and prior to introduction into the conditioning system 17.

Nanobubbles are generated and attach to bitumen droplets. The nanobubbles act as a frosting on bitumen surface or bridge bitumen droplets together or bridge bitumen droplets and larger bubbles together and thus enhance bitumen droplet coalescence and aeration.

Figure 2C:
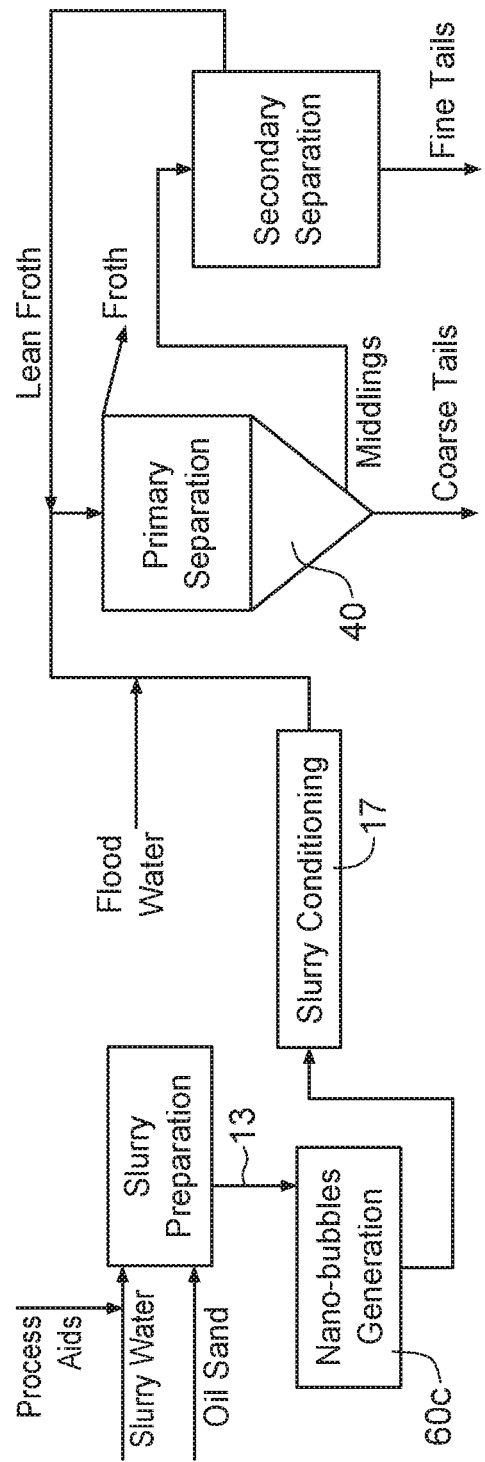
Figure 2D:
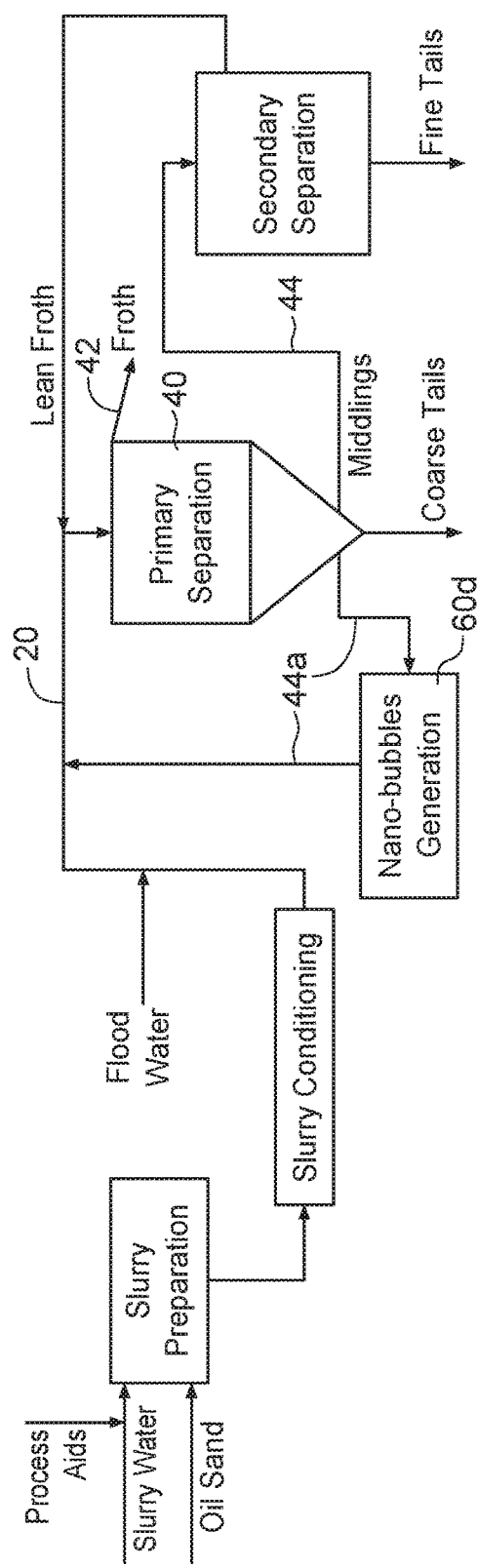
Figure 2E:
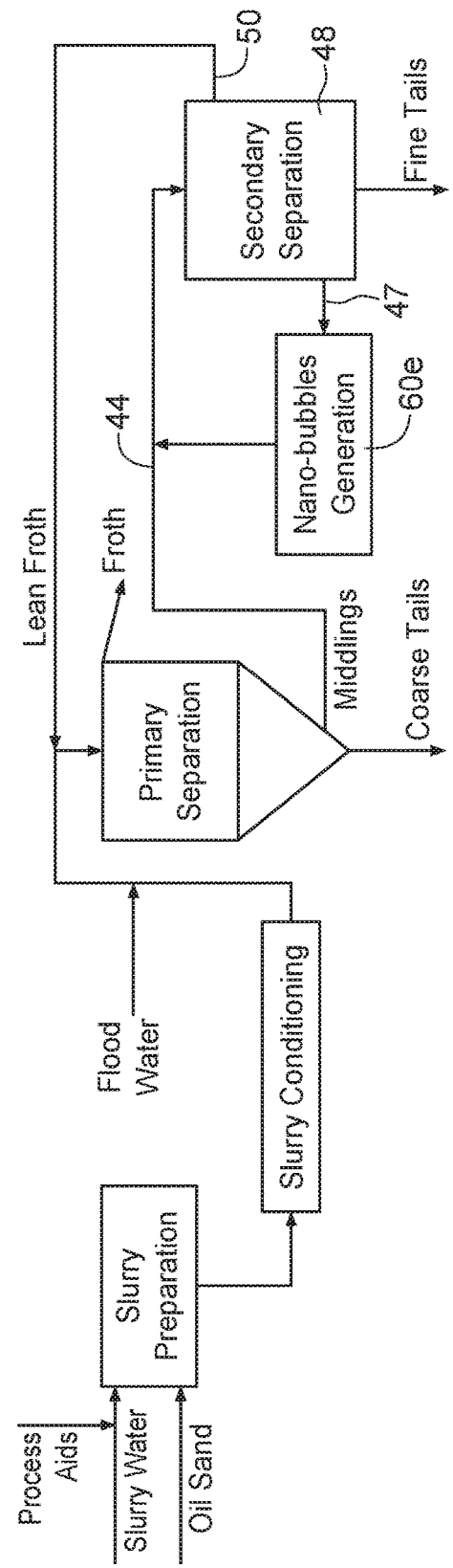

Nanobubble generation can also be applied to recycle steps. For example, a nanobubble generator 60d may be added to a middlings recycle stream 44a from the primary separation step as in shown FIG. 2d or a nanobubble generator 60e may be added to a middlings recycle stream 47 from the secondary separation step as shown in FIG. 2e. In these two embodiments, the focus is on the non-floatable fine bitumen droplets contained in these middlings streams. These fine droplets may become floatable through the action of the nanobubbles and then may be recovered.

The recycle streams may introduce the nanobubble containing middlings to processes for froth recovery. For example, the nanobubble treated middlings recycle stream 44a may be recycled upstream of PSV 40 and the nanobubble treated secondary middlings recycle stream 47 may be recycled to upstream of PSV 40 or to middlings stream 44 passing from the PSV to the secondary separator 48, as shown.

The addition and presence of nanobubbles in the oil sand slurry may enhance the coalescence and aeration of bitumen droplets, thus improving bitumen flotation and the overall extraction performance.

In some embodiments, introduction of the nanobubbles is selected to coincide with the generation of microbubbles. The presence of nanobubbles along with microbubbles, generated for example by turbulence such as in slurry preparation system 10, conditioning system 17, etc. may further enhance bitumen recovery.

In all embodiments, the nanobubble-effected bitumen may at least in part be recovered in froth 42 and/or lean froth 50.

EXAMPLES

A preliminary experimental study has shown that the use of air-saturated water for gas nucleation was able to increase bitumen recovery by 50-170% for different oil sands tested. The nanobubbles present in the oil sand slurry acted as bridges between bitumen droplets and between bitumen droplets and larger bubbles, facilitating bitumen coalescence and aeration. It is believed that nanobubbles may also depress the attachment of fine solid particles onto the bitumen surfaces (i.e. a slime coating) resulting from the use of caustic, to thereby improve overall extraction performance.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

I claim:

1. A process for extracting bitumen from mined oil sands, comprising:
    mixing slurry water and mined oil sands in a slurry preparation unit to form an oil sand slurry containing bitumen droplets;
    conditioning the oil sand slurry to promote bitumen liberation from sand grains, bitumen droplet coalescence and aeration to form a conditioned oil sand slurry, conditioning forming microbubbles having a diameter of greater than 5,000 nm due to natural entrainment of air and mechanical agitation;
    subjecting the conditioned oil sand slurry to gravity separation to form a bitumen froth, a middlings stream and coarse tailings;
    optionally adding flood water to the conditioned oil sand slurry prior to subjecting it to gravity separation; and
    introducing nanobubbles having a diameter of less than 5,000 nm to the slurry water, the flood water, the oil sand slurry, the conditioned oil sand slurry, or combinations thereof.

2. The process as claimed in claim 1, further comprising:
    adding nanobubbles to the middlings stream and subjecting the nanobubbles and middlings stream to gravity separation to form a lean bitumen froth.

3. The process as claimed in claim 1, wherein the nanobubbles attach to the surface of the bitumen droplets and serve as bridges to aid in the attachment of microbubbles to the bitumen droplets to enhance bitumen droplet aeration and to aid in the attachment of the bitumen droplets to one another to enhance bitumen droplet coalescence.

4. The process as claimed in claim 1, wherein the nanobubbles are generated separately prior to the addition to the slurry water, the flood water, the oil sand slurry, the conditioned oil sand slurry, or combinations thereof.

5. The process as claimed in claim 1, wherein the nanobubbles are generated directly in the slurry water, the flood water, the oil sand slurry, the conditioned oil sand slurry, or combinations thereof.

6. The process as claimed in claim 1, wherein the nanobubbles are added to the slurry water.

7. The process as claimed in claim 1, wherein flood water is added to the conditioned oil sand slurry to reduce the slurry density to about 1.4 g/cc to about 1.5 g/cc and the nanobubbles are added to the flood water.

8. The process as claimed in claim 1, wherein the nanobubbles are added to the oil sand slurry.

9. The process as claimed in claim 1, wherein the nanobubbles are added to the conditioned oil sand slurry.

10. The process as claimed in claim 1, further comprising adding at least one process aid to the slurry water.

11. The process as claimed in claim 10, wherein the process aid is NaOH (caustic), sodium silicate, soda ash (sodium carbonate), sodium tri-phosphate, lime, kerosene, diesel, sodium citrate, or combinations thereof.

12. The process as claimed in claim 1, whereby the slurry water has a temperature in the range from about 20° C. to about 95° C.

* * * * *